June 25, 1963 A. E. MARTIN 3,095,503
INFRARED SPECTROMETER RECORDER WHEREIN THE SPECTRA
IS RECORDED ON A LINEAR WAVENUMBER SCALE
Filed Aug. 4, 1960 2 Sheets-Sheet 1

Inventor
A. E. Martin

United States Patent Office 3,095,503
Patented June 25, 1963

3,095,503
INFRARED SPECTROMETER RECORDER WHEREIN THE SPECTRA IS RECORDED ON A LINEAR WAVENUMBER SCALE
Albert E. Martin, Walkergate, Newcastle-upon-Tyne, England, assignor to Sir Howard Grubb Parsons & Company Limited, Newcastle-upon-Tyne, England
Filed Aug. 4, 1960, Ser. No. 46,627
Claims priority, application Great Britain Aug. 27, 1959
3 Claims. (Cl. 250—43.5)

This invention relates to spectrometers, particularly those for use in the infra-red region of the spectrum, although it is not limited to spectrometers for use in this range.

It is convenient in such instruments to record spectra on a linear wavelength or a linear wavenumber scale and spectrometers are known which record spectra on one or other of these scales.

Theoretically the linear wavenumber scale is preferable and it has been agreed by various learned societies that infra-red spectra for publication must have this form of presentation. For prism and grating spectrometers, however, the linear wavelength scale for recorded spectra is in practice easier to achieve from a mechanical construction viewpoint, is more accurate and is generally more satisfactory.

If we consider, by way of example, a prism spectrometer of the well known Littrow type, wherein angular rotation of the Littrow mirror scans or traverses the spectrum produced by the prism across the exit slit of the spectrometer, it is necessary, because of the increase in dispersive power with wavelentgh of a prism, to use a cam to drive the Littrow mirror so that the rate of angular movement of the mirror can be varied over the range of wavelengths being investigated.

For a linear wavelength scale the rate of angular movement of the mirror needs to vary approximately in the ratio 1:4 in the range of wavelengths from 2–15μ with a sodium chloride prism, whereas for a linear wavenumber scale it needs to vary in the ratio 1:225 over the same range.

This large ratio leads to difficulty in the manufacture of an accurate cam drive. As far as grating instruments are concerned the linear wavelength scale produces practically no problem but again for a linear wavenumber scale similar difficulties are met with in the manufacture of an accurate cam drive.

The object of the present invention is to provide a spectrometer whereby spectra can be recorded on a linear wavenumber scale but in which the above mentioned difficulties are substantially overcome.

The invention consists in a spectrometer comprising means for forming a spectrum and driving means for traversing the spectrum across an exit slit, whereby a narrow band of wavelength may be isolated, detecting means receiving radiation from said exit slit and producing an electrical signal proportional to the energy associated with each wavelength, and recording means responsive to the magnitude of the signal from the detecting means and recording spectra on a moving chart, in which spectrometer a linear wavenumber scale is obtained on the chart by providing means to drive the chart at a varying speed which is always proportional to $$\frac{d\lambda}{dt} \frac{1}{\lambda^2}$$

where λ is the wavelength focussed on the exit slit.

The invention also consists in a spectrometer in accordance with the preceding paragraph in which a slider of a potentiometer is driven in synchronism with the driving means traversing the spectrum across the exit slit, such that for a given wavelength passing through the exit slit there is a corresponding position of the slider, and the winding of the potentiometer is graded so that the electrical resistance between the slider and one end of the winding is always proportional to $$1/\lambda^2 \frac{d\lambda}{dt}$$

driving means being provided for the chart which driving means are acted upon by means for maintaining the speed of the chart proportional to the resistance between the said one end of the potentiometer winding and the slider.

The invention also consists in a spectrometer in accordance with the first of the preceding two paragraphs in which, when the rate of change with time of the wavelength of radiation passing through the exit slit is constant, the recording chart is driven through gearing by a shaft rotating in synchronism with the driving means traversing the spectrum across the exit slit, said shaft having a threaded portion in engagement with a threaded bore in a fixed member so that as the shaft rotates it also moves in the direction of its axis, the shaft also carrying two wheels, a driving wheel and a driven wheel, the driving wheel being rigidly coupled to the shaft so as to rotate therewith whilst the driven wheel is free to rotate independently of the shaft, the two wheels being maintained at a fixed distance apart along the shaft axis, the driving wheel being in frictional engagement with a second wheel lying in a plane at right angles to the plane of said driving wheel so that as the shaft moves axially the driving wheel moves in a radial direction across the face of said second wheel to vary its speed, gearing being provided to transmit the motion of said second wheel to a rotating cylinder across the surface of which moves the aforesaid driven wheel which latter wheel is driven by said cylinder and also moves in a radial direction across the surface of a third wheel lying in a plane at right angles to the plane of said driven wheel and which it drives by frictional engagement, the distance (S), at any instant, between the point of engagement of the driving wheel and the second wheel and the axis of the latter, and the point of engagement between the driven wheel and the said third wheel and the axis of the latter, being the same, such that at all times S is directly proportional to λ and the speed of said third wheel which drives the recorder chart is proportional to $1/S^2$ which is proportional to $1/\lambda^2$.

The invention also consists in a spectrometer substantially as described below with reference to the accompanying drawings, in which.

The law of motion which the recorder chart is to follow is determined as follows:

Let the scanning speed of the spectrometer, that is the rate of change of wavelength ($\lambda$) with time ($t$) of radiation focussed on the exit slit, be $$\frac{d\lambda}{dt}$$

and the rate of change of wavenumber N with distance $x$ measured along the chart be $$\frac{dN}{dx}$$

Now $$N = \frac{10000}{\lambda}$$

where N is the number of waves per centimetre and $\lambda$ is in microns.

$$\frac{dN}{dt} = -\frac{10000}{\lambda^2} \frac{d\lambda}{dt} = \frac{dN}{dx} \frac{dx}{dt}$$

Since $$\frac{dN}{dx}$$

is constant for a linear wavenumber scale $$\frac{dx}{dt} \propto \frac{1}{\lambda^2} \frac{d\lambda}{dt}$$

In other words the speed of the chart $$\left(\frac{dx}{dt}\right)$$

is proportional to the product of $$\frac{1}{\lambda^2}$$

and the rate of change of wavelength with time.

$$\frac{d\lambda}{dt}$$

is constant then $$\frac{dx}{dt} \propto \frac{1}{\lambda^2}$$

In the preferred form of the invention $$\frac{d\lambda}{dt}$$

is made constant and in the following description of the means for putting the invention into effect it will be assumed that this is so.

Figure 1:
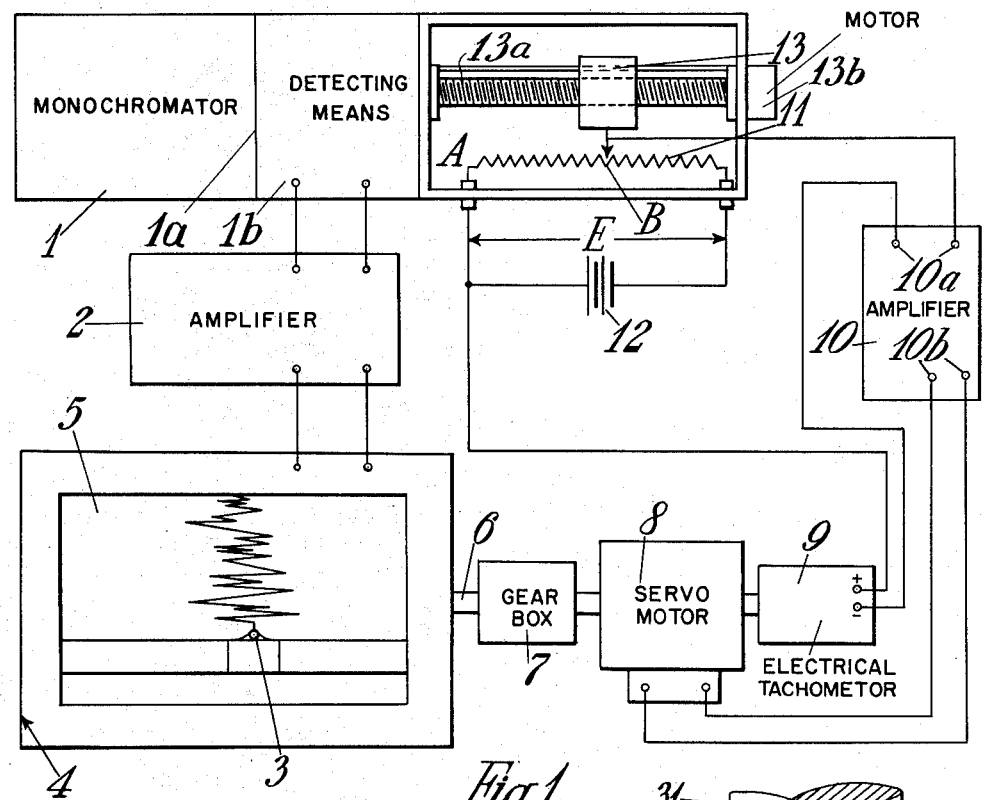
FIGURE 1 shows electrical means for driving the recording chart in accordance with the invention.

In carrying the invention into effect in the form illustrated by way of example and referring first of all to FIGURE 1, a spectrometer comprises a monochromator 1, comprising an entrance slit receiving radiations, means including a prism or diffraction grating for forming a spectrum and driving means for traversing the spectrum across the exit slit of the monochromator, the exit slit being represented diagrammatically at 1a, the radiation from the exit slit falling on a detecting means 1b which produces an electrical signal proportional to the energy associated with each wavelength. All these are standard well-known components in recording spectrometers and for this reason the individual details have not been shown. Also following known practice the output from the detecting means is amplified in an amplifier 2 and fed to the pen recorder generally indicated at 4.

The pen 3 marks a chart 5 mounted on a rotating drum (or driven in other convenient manner) and the speed at which the drum rotates determines the scale on which the spectra are recorded. Normally the speed of the drum is constant and the rate at which the spectrum is traversed across the exit slit of monochromator 1 of the spectrometer determines the nature of the length-wise scale, which in most commercial instruments is linear in wavelength or wavenumber.

In order to produce the non-linear law of motion for the drum and hence the chart 5, in accordance with the present invention, the drum is driven by a shaft 6 through a gear box 7 from a servo motor 8. The servo motor 8 is directly coupled to an electrical tachometer 9 which produces an output voltage proportional to its angular velocity.

The servo motor 8 has its armature winding supplied with a substantially constant D.C. voltage from a separate source not shown, whilst its field winding is supplied by a D.C. output from amplifier 10.

A potentiometer 11 which may be either linear or rotary in form is supplied with a constant voltage E from battery 12. The slider 13 of the potentiometer is linked to the driving means which traverses the spectrum across the exit slit of the monochromator, for example driving means for rotating a diffraction grating or the driving means for rotating a Littrow mirror in a prism spectrometer working on the Littrow principle.

The slider 13 may be linked mechanically to the aforesaid driving means or both may be driven by synchronous motors, and provided the starting points are in correct relation to one another the two will remain in step during the whole of the traversing or scanning period. In the form illustrated in FIGURE 1 the slider 13 moves along a threaded shaft 13a driven by a synchronous motor 13b. The movement of slider 13 is thus directly related to the rate at which the spectrum is traversed across the exit slit.

Figure 3:
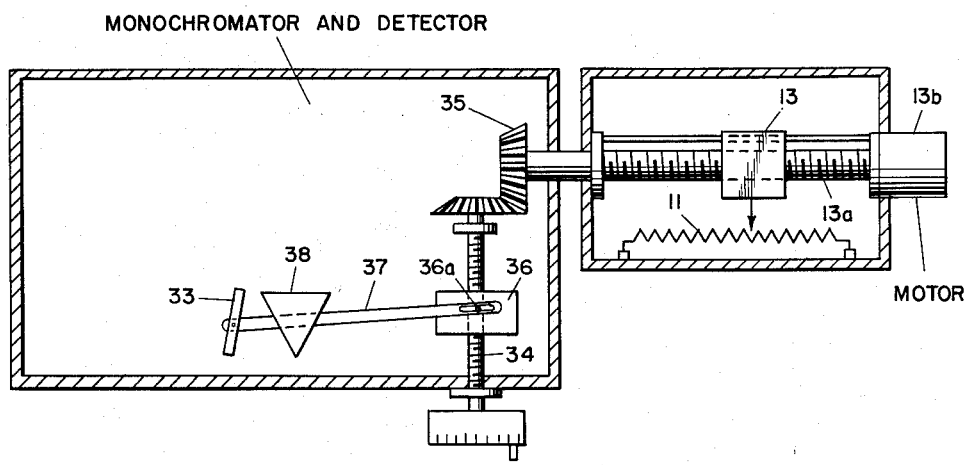
FIG. 3 shows a synchronous arrangement for the slider and spectrum traversing means of FIG. 1.

FIGURE 3 shows one way in which the drive to spectrum traversing means, in the form of a Littrow mirror 33 of a prism monochromator, may be synchronized with movement of the slider of the potentiometer 11.

The threaded shaft 13a drives a further threaded shaft 34 in the monochromator through bevel gearing 35. On the shaft 34 is a carrier 36 which is prevented from rotating on the shaft 34 so that it moves axially along the shaft on rotation thereof. The carrier has a pin 36a which engages a slot on a lever 37. The other end of the lever 37 is attached to Littrow mirror 33. Rotation of the shaft 13a causes rotation of shaft 34 which produces movement of carrier 36 axially. This in turn causes the lever 37 to move the Littrow mirror through an angle.

The mirror 33 works in conjunction with prism 38 in the normal way to traverse the spectrum produced by the prism across the exit slit of the monochromator. Other details of the monochromator are not shown as they are well known standard components.

The winding of the potentiometer 11 is graded so that the resistance between end A of the winding and the position B of the slider 13 is always proportional to $1/\lambda^2$.

The D.C. voltage generated by electrical tachometer 9 is connected in opposition to the voltage across A—B such that any difference between the two voltages is applied to terminals 10a of amplifier 10 and this in turn varies the output from terminals 10b supplied to the field winding of servo motor 8 and hence alters the latter's speed until the voltage across terminals 10a practically disappears. The speed of motor 8 and hence of the chart 5 is thus maintained at a speed proportional to the resistance across A—B and is therefore proportional to $1/\lambda^2$.

The servo system used for making the speed of the chart proportional to the resistance between A and B of the potentiometer, and comprising the motor 8, tachometer 9 and amplifier 10 is a well known system known as the Velodyne system and is described for example in the Journal of the Institution of Electrical Engineers, 1946, 93, part IIIA, p. 1256.

If $$\frac{d\lambda}{dt}$$

is not constant then the potentiometer winding is graded so that for a position of the slider corresponding to wavelength λ the resistance across A—B is proportional to $$\frac{1}{\lambda^2}\frac{d\lambda}{dt}$$

Figure 2:
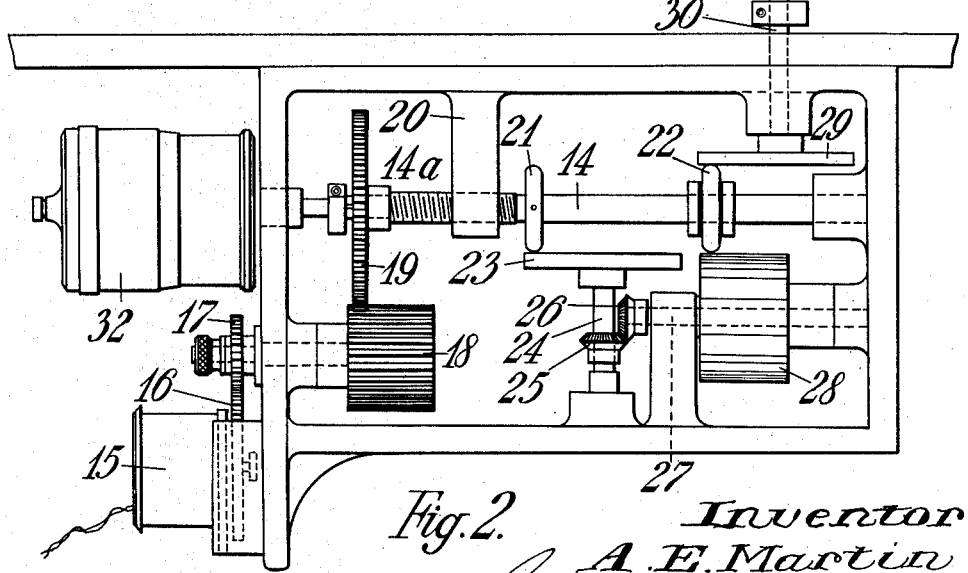
FIGURE 2 shows mechanical means for driving the recording chart.

An alternative way of putting the invention into effect, employing mechanical means, is shown in FIGURE 2 in which a shaft 14 is either coupled to the driving means which traverses the spectrum across the exit slit of the monochromator, so as to rotate in synchronism therewith, or as shown in FIGURE 2 driven separately in synchronism with the aforesaid driving means by a synchronous motor 15 through gearing 16, 17, 18 and 19.

Part 14a of shaft 14 is threaded and engages a threaded bore in a stationary member 20 so that as the shaft rotates it also moves in the direction of its axis. To allow for this axial movement the length in the axial direction of gear wheel 18 is such that gear wheel 19 can move in an axial direction along its surface.

Mounted on shaft 14 are two wheels 21, 22. Wheel 21 is rigidly coupled thereto so as to rotate therewith but wheel 22 is free to rotate independently of the shaft. The two wheels are maintained at a fixed distance apart along the shaft.

The wheel 21 is arranged to drive by frictional engagement wheel 23 which lies in a plane at right angles to that of wheel 21.

Wheel 23 drives shaft 24 which in turn drives shaft 27 through bevel gears 25 and 26. Rigidly attached to shaft 27 is cylinder 28 which is in frictional engagement with wheel 22.

Wheel 22 is in turn in frictional engagement with wheel 29 which lies in a plane at right angles to the plane of wheel 22. Wheel 29 is coupled by shaft 30 to the drum 31 carrying the recording chart.

The arrangement of the wheels is such that the distances of the point of engagement of wheel 21 with wheel 23, from the axis of shaft 24, is the same distance, say S, as the point of engagement of wheel 22 with wheel 29 from the axis of shaft 30. This condition holds throughout the range of movement of shaft 14.

If the radius of wheel 21 is $R_1$, the radius of wheel 22 is $R_2$ and the radius of cylinder 28 is $R_3$, then if shaft 14 rotates at N r.p.m. the wheel 23 rotates at $$\frac{N \times R_1}{S} \text{ r.p.m.}$$

and assuming for the sake of simplicity that the bevel gears 25 and 26 rotate shaft 27 and hence cylinder 28 at the same speed, the speed of wheel 22 is $$N\frac{R_1}{S}\frac{R_3}{R_2} \text{ r.p.m.}$$

The speed of wheel 29 driven by wheel 22 is therefore $$\frac{N.R_1}{S}\cdot\frac{R_3}{R_2}\cdot\frac{R_2}{S}$$

which is $$\frac{NR_1R_3}{S^2}$$

The shaft 14 is driven in synchronism with the driving means for the traversing of the spectrum across the exit slit, and in correct speed relationship to it such that provided the initial position of wheel 21 is correct for the starting wavelength, the value of S subsequently maintains the desired proportionality to λ for the whole spectral scan. The speed of wheel 29 and hence of the recording drum 31 is therefore proportional to $1/\lambda^2$ and the chart on the drum consequently rotates at the speed required to give a linear wavenumber scale.

It has been assumed for the sake of simplicity in the above statement that the bevel gears 25 and 26 are such that cylinder 28 rotates at the same speed as shaft 24, but this is not essential to the working of the device.

The cylinder 28 is also of such a length in the axial direction that wheel 22 can move along it when shaft 14 moves.

The position of wheel 21 and corresponding value of S at any instant are indicated by reference to graduated drum 32, which is driven by shaft 14. For convenience the drum can be directly graduated in "wavelengths."

By driving the chart in the way described instead of at a constant speed as is normal practice, the mechanism in the spectrometer for traversing the spectrum across the slit can be kept as simple as in a spectrometer designed to have a linear wavelength scale and yet the advantage of having a linear wavenumber scale can be realised.

I claim:
1. In a spectrometer having means for forming a spectrum and driving means for traversing the spectrum across the exit slit whereby a narrow band of wavelength can be isolated and including detecting means receiving radiation from said exit slit to produce an electrical signal proportional to the energy associated with each wavelength and recording means incorporating a movable chart and a relatively fixed recorder responsive to the magnitude of the signal from the detecting means for recording the signal on the chart, the provision of means for moving the chart at a varying speed proportional to

$$\frac{d\lambda}{dt}\frac{1}{\lambda^2}$$

where λ is the wavelength focussed on the exit slit.

2. In a spectrometer as claimed in claim 1 in which the means for moving the chart at variable speed comprise a potentiometer comprising a graded electrical winding and a slider therefor the resistance of the graded winding between the slider and one end of the winding being always proportional to $$\frac{1}{\lambda^2}\frac{d\lambda}{dt}$$

means for driving the slider in synchronism with the driving means traversing the spectrum across the exit slit, whereby for a given wavelength passing through the exit slit there is a corresponding position of the slider, a drive for the chart and control means connected to said chart drive and maintaining the speed thereof at a value proportional to the resistance between the said one end of the potentiometer winding and the slider.

3. In a spectrometer having means for traversing the spectrum across the exit slit whereby a narrow band of wavelength can be isolated and including detecting means receiving radiation from said exit slit to produce an electrical signal proportional to the energy associated with each wavelength and recording means incorporating a movable chart and responsive to the magnitude of the signal from the detecting means, the provision of means for moving the chart at a varying speed proportional to $$\frac{d\lambda}{dt}\frac{1}{\lambda^2}$$

where λ is the wavelength focused on the exit slit, said driving means traverse the spectrum across the exit slit at a speed to provide a constant rate of change with respect to time of the wavelength focussed on the exit slit, the means for moving the chart comprising a threaded rotatable shaft driven in synchronism with the driving means and mounted for axial movement, a fixed member engaging the thread of the shaft for causing axial movement thereof upon rotation of the shaft, a pair of spaced wheels mounted on the shaft at a fixed distance apart, a first of said wheels being rigidly coupled to the shaft for rotation therewith, the second of the wheels being mounted for free rotation thereon, a third wheel mounted for rotation about an axis normal to the shaft with one face in frictional engagement with the periphery of the first wheel, a cylinder mounted for rotation about an axis normal to that of the third wheel and geared thereto for rotation thereby, the periphery of the cylinder being in engagement with the periphery of the second wheel, a further wheel rotatable about an axis normal to the said shaft and having one face in frictional engagement with the periphery of the second wheel, the said first wheels and second wheels moving radially across the faces of the third and fourth wheels respectively upon rotation of the shaft, the distance S of the point of engagement of the first and third wheels from the axis of the latter being at all times proportional to $\lambda$ and equal to the distance between the point of engagement of the second and fourth wheels from the axis of the latter, and the speed of the fourth wheel is proportional to $1/S^2$ such that the speed of the chart is proportional to $1/\lambda^2$.

References Cited in the file of this patent

UNITED STATES PATENTS

| | | |
|---|---|---|
| 2,476,005 | Thomas | July 12, 1949 |
| 2,582,073 | Scudder | Jan. 8, 1952 |
| 2,656,468 | Schlesman | Oct. 20, 1953 |
| 2,768,306 | Grubb et al. | Oct. 23, 1956 |
| 2,834,247 | Pickels | May 13, 1958 |